United States Patent
Venugopal et al.

(10) Patent No.: US 11,930,488 B2
(45) Date of Patent: Mar. 12, 2024

(54) TECHNIQUES FOR SIGNALING UPLINK TRANSMISSION CONFIGURATION INDICATOR STATES

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Tianyang Bai, Somerville, NJ (US); Junyi Li, Chester, NJ (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/081,602

(22) Filed: Oct. 27, 2020

(65) Prior Publication Data

US 2021/0195616 A1 Jun. 24, 2021

Related U.S. Application Data

(60) Provisional application No. 62/949,959, filed on Dec. 18, 2019.

(51) Int. Cl.
*H04W 72/21* (2023.01)
*H04W 72/1268* (2023.01)
*H04W 72/23* (2023.01)

(52) U.S. Cl.
CPC ....... *H04W 72/1268* (2013.01); *H04W 72/21* (2023.01); *H04W 72/23* (2023.01)

(58) Field of Classification Search
CPC ......... H04W 72/1268; H04W 72/1284; H04W 72/1289; H04W 72/12; H04L 5/0053; H04L 5/0094; H04L 5/00; H04B 7/063
See application file for complete search history.

(56) References Cited

U.S. PATENT DOCUMENTS

2019/0103908 A1* 4/2019 Yu .................... H04B 7/0695
2019/0320469 A1* 10/2019 Huang ................. H04W 72/14
(Continued)

FOREIGN PATENT DOCUMENTS

EP 4068877 A1 * 10/2022
WO WO-2020157703 A1 * 8/2020 .......... H04B 7/0695

OTHER PUBLICATIONS

3GPP TS 38.214: "3rd Generation Partnership Project, Technical Specification Group Radio Access Network, NR, Physical Layer Procedures for Data (Release 15)", 3GPP Standard Technical Specification, 3rd Generation Partnership Project (3GPP), Mobile Competence Centre, 650, Route Des Lucioles, F-06921 Sophia-Antipolis Cedex, France, vol. RAN WG1, No. V15.7.0, Sep. 28, 2019 (Sep. 28, 2019), pp. 1-106, XP051785090, Retrieved from the Internet: URL: http://ftp.3gpp.org/Specs/archive/38_series/38.214/38214-f70.zip 38214-f70.docx [retrieved on Aug. 17, 2019].
(Continued)

*Primary Examiner* — Nathan S Taylor
(74) *Attorney, Agent, or Firm* — Dalei Dong; ArentFox Schiff LLP

(57) ABSTRACT

Techniques for signaling uplink transmission configuration indicator (TCI) states are disclosed. In an example, a base station may determine one or more capabilities of a user equipment (UE). The base station may also determine one or more uplink TCI states for the UE to use based on the one or more capabilities. The base station may also transmit, to the UE, signaling of the one or more uplink TCI states.

26 Claims, 7 Drawing Sheets

(56) References Cited

U.S. PATENT DOCUMENTS

| | | | | |
|---|---|---|---|---|
| 2019/0349964 | A1* | 11/2019 | Liou | H04W 72/1284 |
| 2020/0100232 | A1* | 3/2020 | Onggosanusi | H04B 7/0695 |
| 2021/0044343 | A1* | 2/2021 | Onggosanusi | H04B 7/0695 |
| 2021/0076388 | A1* | 3/2021 | Miao | H04W 72/0493 |
| 2021/0184812 | A1* | 6/2021 | MolavianJazi | H04L 5/0048 |
| 2021/0385045 | A1* | 12/2021 | Frenne | H04L 5/0048 |
| 2021/0385832 | A1* | 12/2021 | Zhang | H04W 80/02 |
| 2022/0015118 | A1* | 1/2022 | Park | H04B 7/0695 |
| 2022/0116979 | A1* | 4/2022 | Park | H04L 5/0023 |
| 2022/0131642 | A1* | 4/2022 | Kim | H04L 1/0067 |
| 2022/0150011 | A1* | 5/2022 | Kim | H04L 1/0067 |
| 2022/0159641 | A1* | 5/2022 | Kim | H04W 24/10 |
| 2022/0174708 | A1* | 6/2022 | Kim | H04L 1/1642 |
| 2022/0191081 | A1* | 6/2022 | Kim | H04L 5/0051 |
| 2022/0191892 | A1* | 6/2022 | Muruganathan | H04L 5/0098 |
| 2022/0201734 | A1* | 6/2022 | Kim | H04W 72/12 |
| 2022/0239440 | A1* | 7/2022 | Go | H04L 5/0091 |
| 2022/0272674 | A1* | 8/2022 | Go | H04W 72/23 |
| 2022/0294578 | A1* | 9/2022 | Kim | H04L 5/005 |
| 2022/0337300 | A1* | 10/2022 | Yuk | H04L 5/0092 |
| 2022/0368486 | A1* | 11/2022 | Khoshnevisan | H04L 5/0094 |
| 2022/0400489 | A1* | 12/2022 | Kim | H04W 72/23 |

OTHER PUBLICATIONS

International Search Report and Written Opinion—PCT/US2020/057751—ISA/EPO—dated Feb. 9, 2021.

LG Electronics: "Discussion on Multi-Beam Based Operations and Enhancements", 3GPP Draft, 3GPP TSG RAN WG1 Meeting #98, R1-1908700 Multi-Beam_Final, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051765308, 13 pages, Retrieved from the Internet: URL: http://www.3gpp.org/ftp/tsg_ran/WG1_RL1/TSGR1_98/Docs/R1-1908700.zip [retrieved on Aug. 17, 2019] section 2.1.

OPPO: "Discussion on Multi-Beam Operation Enhancements", 3GPP Draft, 3GPP TSG RAN WG1 #98, R1-1908352, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051764961, 9 pages, Retrieved from the Internet: URL: http://www.3gpp.org/ftp/tsg_ran/WG1_RL1/TSGR1_98/Docs/R1-1908352.zip [retrieved on Aug. 17, 2019] p. 2, line 25—p. 3, line 21 p. 8, line 3—line 20.

Qualcomm Incorporated: "Multi-TRP Enhancements", 3GPP Draft, 3GPP TSG-RAN WG1 Meeting #99, R1-1912967, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 18, 2019-Nov. 22, 2019, Nov. 9, 2019 (Nov. 9, 2019), XP051823729, 21 pages, Retrieved from the Internet: URL: https://ftp.3gpp.org/tsg_ran/WG1_RL1/TSGR1_99/Docs/R1-1912967.zip, [retrieved on Nov. 9, 2019], p. 1-p. 7, tables 1-5, p. 1, line 25-57.

\* cited by examiner

TECHNIQUES FOR SIGNALING UPLINK TRANSMISSION CONFIGURATION INDICATOR STATES

CROSS-REFERENCE TO RELATED APPLICATION(S)

This application claims the benefit of U.S. Provisional Application Ser. No. 62/949,959, entitled "TECHNIQUES FOR SIGNALING UPLINK TRANSMISSION CONFIGURATION INDICATOR STATES" and filed on Dec. 18, 2019, which is expressly incorporated by reference herein in its entirety.

BACKGROUND

Aspects of the present disclosure relate generally to communication systems, and more particularly, to techniques for signaling uplink transmission configuration indicator (TCI) states.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) new radio (NR) technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC). Some aspects of 5G NR technologies may be based on the fourth generation (4G) Long Term Evolution (LTE) standard.

During beam management, different schemes, including space division multiplexing (SDM) schemes, frequency division multiplexing (FDM) schemes, or time division multiplexing (TDM) schemes, may be used across multiple transmission and reception points. These schemes may allow for a more unified TCI framework for downlink (DL) and uplink (UL) beam indication. While wireless networks provide signaling for configuring DL transmissions according to the different schemes, these wireless networks do not provide signaling for configuring the UL transmissions based on the schemes. Accordingly, there exists a need for further improvements in 5G NR technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is provided. The method may include receiving, from a base station, signaling indicating one or more uplink (UL) transmission configuration indicator (TCI) states; configuring, based on the signaling indicating the one or more UL TCI states, the one or more UL TCI states to be used by the UE for UL transmissions; and transmitting, to the base station, the UL transmissions based on the one or more UL TCI states.

In another aspect, a method of wireless communication by a UE is provided. The method may include receiving, from a base station, signaling indicating a first UL TCI codepoint mapped to one or more first UL TCI states; determining that the one or more first UL TCI states of the first UL TCI codepoint are not configured for UL transmissions; determining, in response to the one or more first UL TCI states not being configured, one or more second UL TCI states of a default UL TCI codepoint that are configured for the UL transmissions; and transmitting, to the base station, the UL transmissions based on the one or more second UL TCI states.

In another aspect, a method of wireless communication by a base station is provided. The method may include determining one or more capabilities of a UE; determining one or more UL TCI states for the UE to use based on the one or more capabilities; and transmitting, to the UE, signaling of the one or more UL TCI states.

In another aspect, a method of wireless communication by a base station is provided. The method may include transmitting, to a UE, signaling indicating a first UL TCI codepoint mapped to one or more first UL TCI states; receiving, from the UE in response to the transmitting the signaling, UL transmissions based on one or more second UL TCI states of a default UL TCI codepoint; determining, based on the received UL transmissions, that the one or more first UL TCI states of the first codepoint were not configured for UL transmissions; and storing an indication that the one or more first UL TCI states are not configured by the UE for the UL transmissions.

In one or more other aspects, apparatus and computer-readable mediums which perform the methods described herein are disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
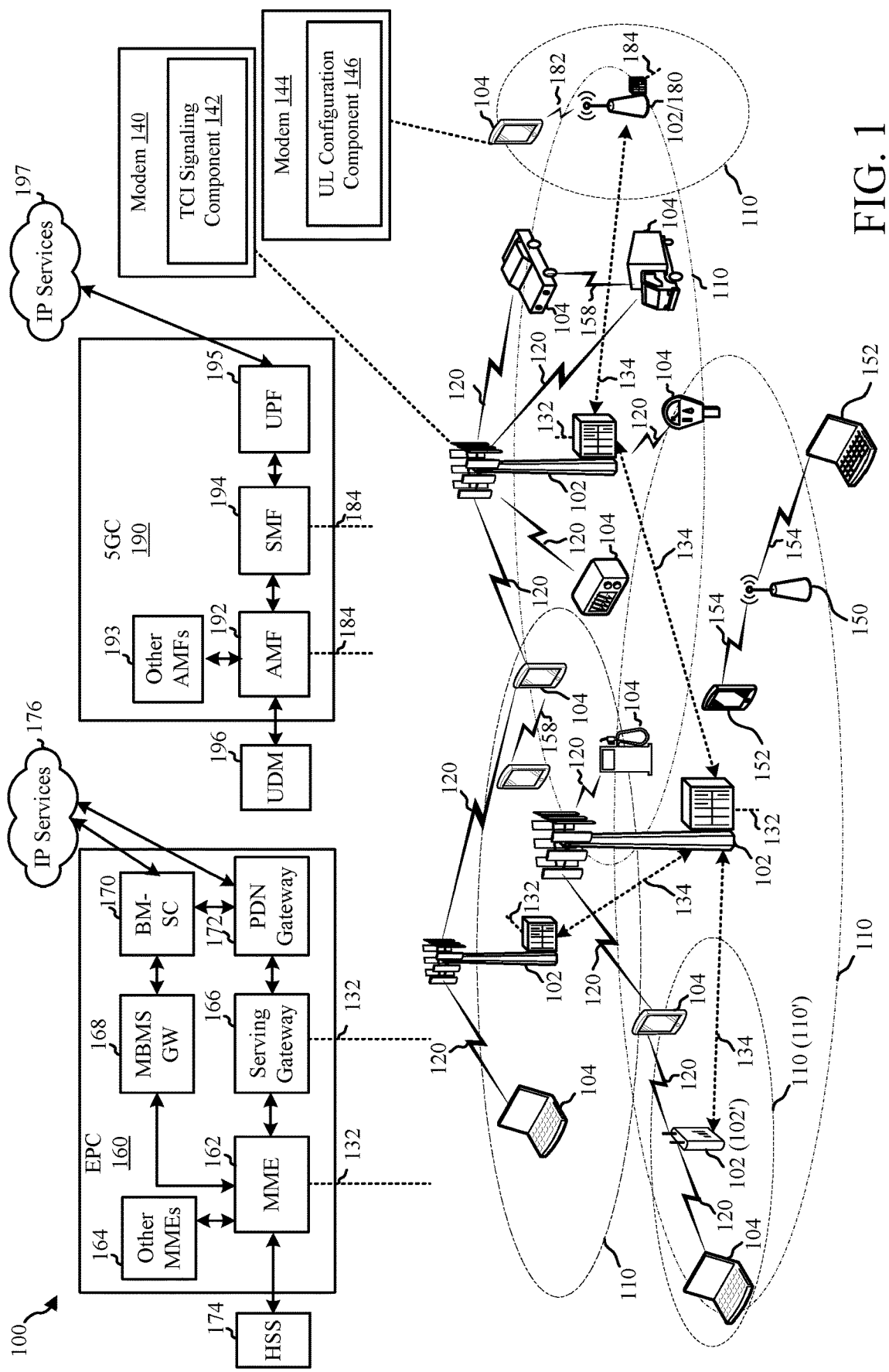
FIG. 1 is a schematic diagram of an example wireless communications system and access network, according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Enhancements to multi-beam operations, such as frequency range 2 (FR2) and frequency range 1 (FR1), may include identifying and specifying features to facilitate more efficient (e.g., lower latency and overhead) downlink (DL)/uplink (UL) beam management to support higher intra-cell mobility and layer 1 (L1)/layer 2 (L2)-centric inter-cell mobility and/or a larger number of configured transmission configuration indicator (TCI) states. These features may include: common beams for data and control transmission/reception for DL and UL transmissions, especially for intra-band carrier aggregation (CA); unified TCI framework for DL/UL beam indication; and enhancements on signaling mechanisms for the above features to improve latency and efficiency, such as more dynamic usage of control signalling, as opposed to radio resource control (RRC) signals.

The enhancements may also include identifying and specifying features to facilitate UL beam selection for user equipments (UEs) equipped with multiple panels including: UL beam indications based on the unified TCI framework; enabling simultaneous transmission across multiple panels (STxMP); and/or enabling panel selection. The enhancements may also include studying UE-initiated or L1-event-driven beam management for reducing latency and probability of beam failure events.

Additionally, enhancements for the support of multi-transmission and reception points (mTRPs) deployment, which may target both FR1 and FR2, may include identifying and specifying features to improve reliability and robustness for channels other than physical DL share channel (PDSCH), such as physical DL control channel (PDCCH), physical UL share channel (PUSCH), and physical UL control channel (PUCCH) using mTRPs and/or multi-panels, with reliability features used as a baseline. These enhancements may also include identifying and specifying features to enable inter-cell multi-TRP operations. These enhancements may also include evaluating and, if needed, specifying enhancements for simultaneous multi-TRP transmission with multi-panel reception.

For UL transmissions, space division multiplexing (SDM)/frequency division multiplexing (FDM)/time division multiplexing (TDM) schemes across mTRPs may also be extended. By using these schemes for UL transmissions, a more unified TCI framework for DL and UL beam indication may be achieved. Alternatively, introduction of a UL-TCI framework and support for UL-TCI based signalling analogous to DL beam indication may be considered to support multi-panel enhancements for UL. In the context of a DL, the schemes are supported as follows: scheme 1—SDM; scheme 2a—FDM and one control word (CW); scheme 2b—FDM and two CWs of the same transport block (TB); scheme 3—TDM within a slot; and scheme 4—TDM in different slots. These schemes may be extended for UL.

According to aspects of the present disclosure, multiple UL TCI states may be used to indicate UL transmissions. In an example, the multiple TCI states may be based on one or more SDM schemes, FDM schemes, or TDM schemes across indicated UL TCI states.

In another aspect, multiple UL TCI states may be mapped to a single UL TCI codepoint of a DL configuration indicator (DCI) that is scheduling a UL transmission. The multiple UL TCI states may be indicated through signalling, such as one or more of a DCI signal, a media access control-control element (MAC-CE) signal, or a radio resource control (RRC) signal. In some examples, the multiple UL TCI states are mapped to a single DCI based UL mTRP transmission.

In an aspect, multiple UL TCI states can be mapped to one composite mTRP UL TCI state in a DCI that is scheduling a UL transmission. The indication of these multiple UL TCI states may be signalled via, for example, a DCI signal, a MAC-CE signal, or an RRC signal. In an example, UL transmissions may include one or more sound reference signal (SRS), PUCCH signal, PUSCH signal, or PRACH signal.

In case of SDM, UL signals indicated by UL TCI states may be transmitted simultaneously in overlapped frequency resources. In case of FDM, UL signals indicated by UL TCI states may be transmitted simultaneously in non-overlapped frequency resources. In case of TDM, UL signals indicated by UL TCI states may be transmitted in different time resources, either slot or sub-slot based TDM.

In another aspect, at least one UL TCI codepoint may be mapped to multiple UL TCI states. For example, multiple UL TCI states may be mapped to a single DCI based on a UL mTRP operation mode. However, when a UE receives an indication of the multiple UL TCI states, the UE may be unable to use some of the UL TCI states due to, for example, a UL TCI state not being configured (e.g., when a relation or UL TCI is not indicated for certain resources or when a scheduled UL transmission is within a time-domain scheduling threshold). Accordingly, a default UL beam of SRS, PUCCH, PUSCH, or PRACH, may be used based on the previously used TCI codepoint. In an example, the UL beam may rely on a lowest index or a highest index of previously used UL TCI codepoint or rely on a recent successfully used TCI codepoint.

Turning now to the figures, examples of techniques for signaling UL TCI states are depicted. It is to be understood that aspects of the figures may not be drawn to scale and are instead drawn for illustrative purposes.

Referring to FIG. 1, a diagram illustrating an example of a wireless communications system and an access network 100 is provided. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a TCI signaling component 142 configured to signal to the UE 104 multiple TCI states and a codepoint indicating the multiple TCI states. For example, the TCI signaling component 142 may determine one or more capabilities of the UE 104, determine one or more UL TCI states for the UE 104 to use based on the one or more capabilities, and transmit, to the UE 104, signaling of the one or more UL TCI states.

In another example, the TCI signaling component 142 may transmit, to the UE 104, signaling indicating a first UL TCI codepoint mapped to one or more first UL TCI states, receive, from the UE 104 in response to the transmitting the signaling, UL transmissions based on one or more second UL TCI states of a default UL TCI codepoint, determine, based on the received UL transmissions, that the one or more first UL TCI states of the first codepoint were not configured for UL transmissions, and store an indication that the one or more first UL TCI states are not configured by the UE 104 for the UL transmissions.

The UE 104 may include a modem 144 having a UL configuration component 146 configured to receive signaling from the base station 102 and transmit a UL transmission based on the signaling. For example, the UL configuration component 146 may receive, from the base station 102, signaling indicating a first UL TCI codepoint mapped to one or more first UL TCI states, determine that the one or more first UL TCI states of the first UL TCI codepoint are not configured for UL transmissions, determine, in response to the one or more first UL TCI states not being configured, one or more second UL TCI states of a default UL TCI codepoint that are configured for the UL transmissions, and transmit, to the base station, the UL transmissions based on the one or more second UL TCI states.

In another example, the UL configuration component 146 may receive, from a base station 102, signaling indicating a first UL TCI codepoint mapped to one or more first UL TCI states, determine that the one or more first UL TCI states of the first UL TCI codepoint are not configured for UL transmissions, determine, in response to the one or more first UL TCI states not being configured, one or more second UL TCI states of a default UL TCI codepoint that are configured for the UL transmissions, and transmit, to the base station, the UL transmissions based on the one or more second UL TCI states.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5GNR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). Each of the backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
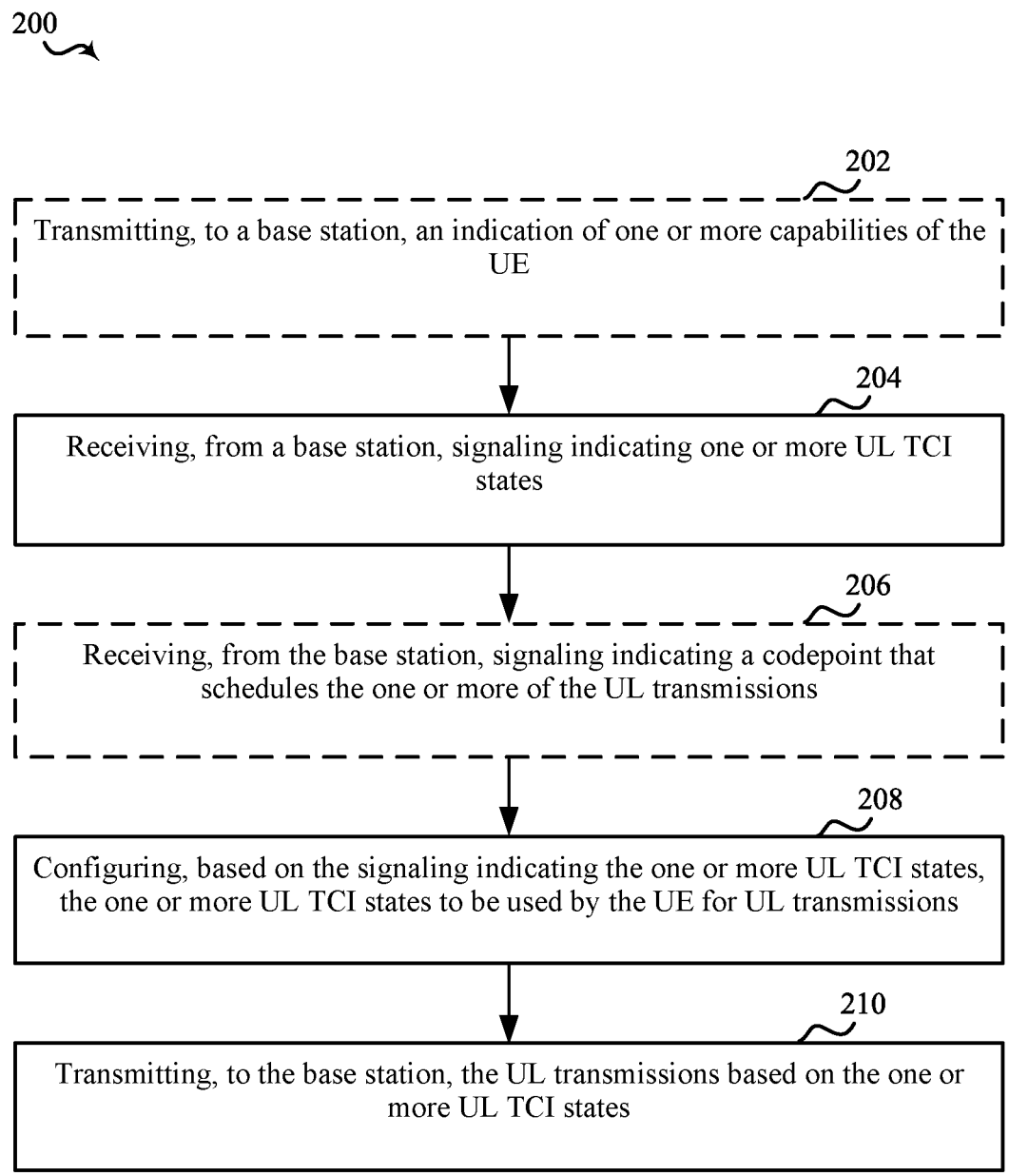
FIG. 2 is a flowchart of an example method of wireless communications by a UE, according to aspects of the present disclosure.
Figure 3:
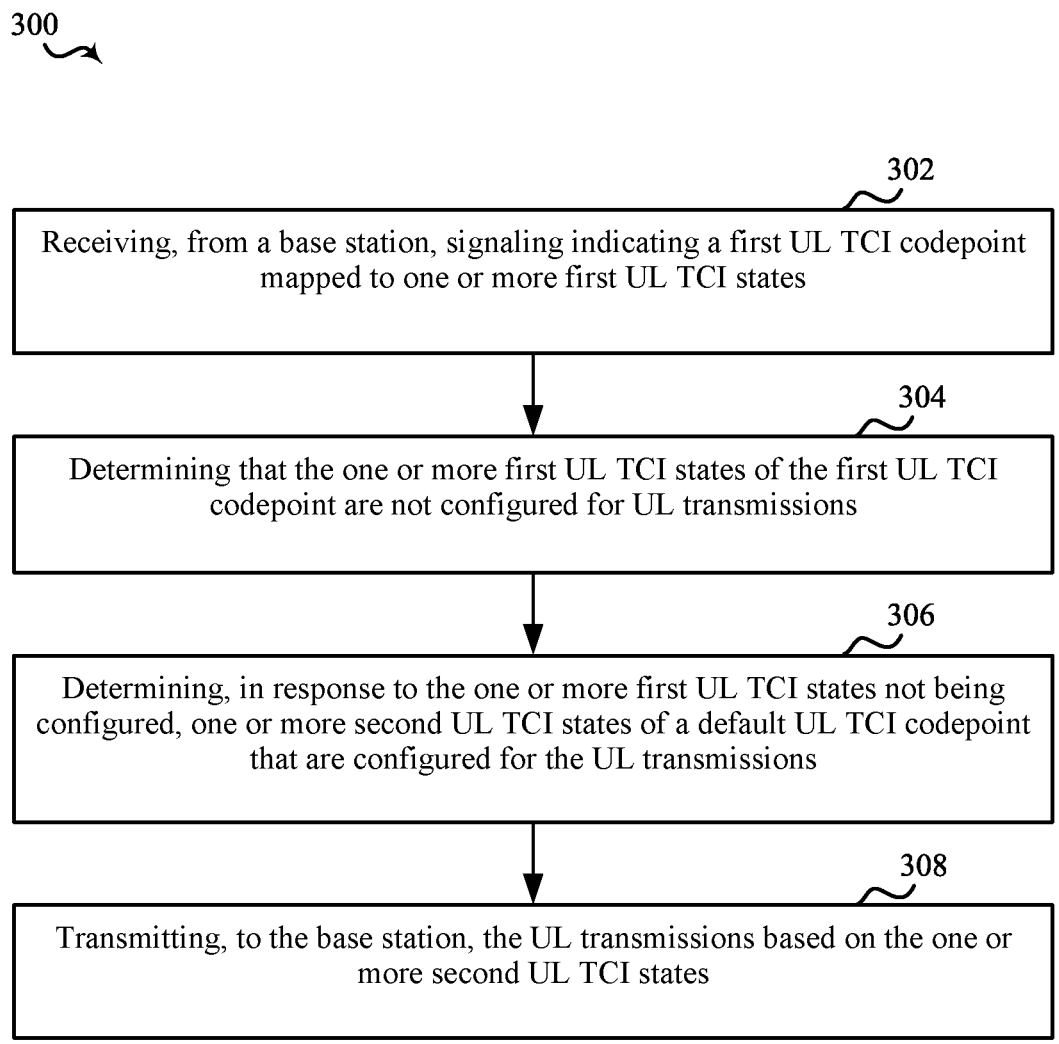
FIG. 3 is a flowchart of another example method of wireless communications by a UE, according to aspects of the present disclosure.

Referring to FIGS. 2 and 3, example methods 200 and 300 of wireless communications are disclosed. The methods 200 and 300 may be performed by the UE 104 of FIG. 1 along with any of the components (see e.g., FIG. 4) of the UE 104. For example, the methods 200 and 300 may be performed by one or more of a processor 412, a transceiver 402, the modem 144, the UL configuration component 146, and/or one or more additional components/subcomponents of the UE 104.

Turning to FIG. 2, at 202, the method 200 may optionally include transmitting, to the base station, an indication of one or more capabilities of the UE. For example, one or more of the processor 412, the transceiver 402, the modem 144, the UL configuration component 146, and/or one or more components/subcomponents of the UE 104 may be configured to transmit, to the base station 102, an indication of one or more capabilities of the UE 104. Thus, the processor 412, the transceiver 402, the modem 144, the UL configuration component 146, and/or one or more components/subcomponents of the UE 104 may define the means for transmitting, to the base station 102, an indication of one or more capabilities of the UE 104. In an example, the one or more capabilities of the UE 104 may include, for example, capabilities of the UE 104 to support multiple transmissions from multiple panels of a base station 102 or capabilities of the UE 104 to support a switching time to activate transmissions between panels of the base station 102.

At 204, the method 200 may include receiving, from a base station, signaling indicating one or more UL TCI states. For example, one or more of the processor 412, the transceiver 402, the modem 144, the UL configuration component 146, and/or one or more components/subcomponents of the UE 104 may be configured to receive, from the base station 102, signaling indicating one or more UL TCI states. Thus, the processor 412, the transceiver 402, the modem 144, the UL configuration component 146, and/or one or more components/subcomponents of the UE 104 may define the means for receiving, from the base station 102, signaling indicating one or more UL TCI states. In an example, the signaling indicating the one or more UL TCI states is indicated via a mapping of the one or more UL TCI states to a single UL TCI codepoint. In an example, the signaling may be received via one or more of a DCI signal, a MAC-CE signal, or an RRC signal. In an example, the signaling may indicate the one or more UL TCI states via a mapping of the one or more UL TCI states to a single composite mTRP UL TCI state.

In an example, the one or more UL TCI states may be based on one or more of an SDM scheme, an FDM scheme, or a TDM scheme. When the one or more UL TCI states are based on the SDM scheme, the UL transmissions may be transmitted simultaneously in overlapped frequency resources. When the one or more UL TCI states are based on the FDM scheme, the UL transmissions may be transmitted simultaneously in non-overlapped frequency resources. When the one or more UL TCI states are based on the TDM scheme, the UL transmissions may be transmitted in different time resources.

At 206, the method 200 may include receiving, from the base station, signaling indicating a codepoint that schedules the one or more of the UL transmissions. For example, one or more of the processor 412, the transceiver 402, the modem 144, the UL configuration component 146, and/or one or more components/subcomponents of the UE 104 may be configured to receive, from the base station 102, signaling indicating a codepoint that schedules the one or more of the UL transmissions. Thus, the processor 412, the transceiver 402, the modem 144, the UL configuration component 146, and/or one or more components/subcomponents of the UE 104 may define the means for receiving, from the base station 102, signaling indicating a codepoint that schedules the one or more of the UL transmissions. In an example, the codepoint is a code, a string, or one or more bits of a DCI signal. In an example, the UL transmissions are one or more of a SRS, a PUCCH, a PUSCH, or a PRACH.

At 208, the method 200 may include configuring, based on the signaling indicating the one or more UL TCI states, the one or more UL TCI states to be used by the UE for UL transmissions. For example, one or more of the processor 412, the modem 144, the UL configuration component 146, and/or one or more components/subcomponents of the UE 104 may be configured to configure, based on the signaling indicating the one or more UL TCI states, the one or more UL TCI states to be used by the UE 104 for UL transmissions. Thus, the processor 412, the modem 144, the UL configuration component 146, and/or one or more components/subcomponents of the UE 104 may define the means for configuring, based on the signaling indicating the one or more UL TCI states, the one or more UL TCI states to be used by the UE 104 for UL transmissions. In an example, the determining of the one or more UL TCI states may be further based on the signaling indicating the codepoint. In an example, the one or more UL TCI states may be configured based on configuring one or more spatial relations parameters of one or more beams and using ports or signals that satisfy quasi co-location (QCL) properties as indicated by the TCI state for the UL transmission in scheduled time/frequency resources.

At 210, the method 200 may include transmitting, to the base station, the UL transmissions based on the one or more UL TCI states. For example, one or more of the processor 412, the transceiver 402, the modem 144, the UL configuration component 146, and/or one or more components/subcomponents of the UE 104 may be configured to transmit, to the base station 102, the UL transmissions based on the one or more UL TCI states. Thus, the processor 412, the transceiver 402, the modem 144, the UL configuration component 146, and/or one or more components/subcomponents of the UE 104 may define the means for transmitting, to the base station 102, the UL transmissions based on the one or more UL TCI states.

Turning to FIG. 3, at 302, the method 300 may include receiving, from a base station, signaling indicating a first UL TCI codepoint mapped to one or more first UL TCI states. For example, one or more of the processor 412, the transceiver 402, the modem 144, the UL configuration component 146, and/or one or more components/subcomponents of the UE 104 may be configured to receive, from the base station 102, signaling indicating a first UL TCI codepoint mapped to one or more first UL TCI states. Thus, the processor 412, the transceiver, the modem 144, the UL configuration component 146, and/or one or more components/subcomponents of the UE 104 may define the means for receiving, from a base station 102, signaling indicating the first UL TCI codepoint mapped to one or more first UL TCI states.

At 304, the method 300 may include determining that the one or more first UL TCI states of the first UL TCI codepoint are not configured for UL transmissions. For example, one or more of the processor 412, the modem 144, the UL configuration component 146, and/or one or more components/subcomponents of the UE 104 may be configured to determine that the one or more first UL TCI states of the first UL TCI codepoint are not configured for UL transmissions. Thus, the processor 412, the transceiver, the modem 144, the UL configuration component 146, and/or one or more components/subcomponents of the UE 104 may define the means for determining that the one or more first UL TCI states of the first UL TCI codepoint are not configured for UL transmissions.

At 306, the method 300 may include determining, in response to the one or more first UL TCI states not being configured, one or more second UL TCI states of a default UL TCI codepoint that are configured for the UL transmissions. For example, one or more of the processor 412, the modem 144, the UL configuration component 146, and/or one or more components/subcomponents of the UE 104 may be configured to determine, in response to the one or more first UL TCI states not being configured, one or more second UL TCI states of a default UL TCI codepoint that are configured for the UL transmissions. Thus, the processor 412, the modem 144, the UL configuration component 146, and/or one or more components/subcomponents of the UE 104 may define the means for determining, in response to the one or more first UL TCI states not being configured, one or more second UL TCI states of a default UL TCI codepoint that are configured for the UL transmissions.

At 308, the method 300 may include transmitting, to the base station, the UL transmissions based on the one or more second UL TCI states. For example, one or more of the processor 412, the transceiver 402, the modem 144, the UL configuration component 146, and/or one or more components/subcomponents of the UE 104 may be configured to transmit, to the base station 102, the UL transmissions based on the one or more second UL TCI states. Thus, the processor 412, the transceiver 402, the modem 144, the UL configuration component 146, and/or one or more components/subcomponents of the UE 104 may define the means for transmitting, to the base station 102, the UL transmissions based on the one or more second UL TCI states.

Figure 4:
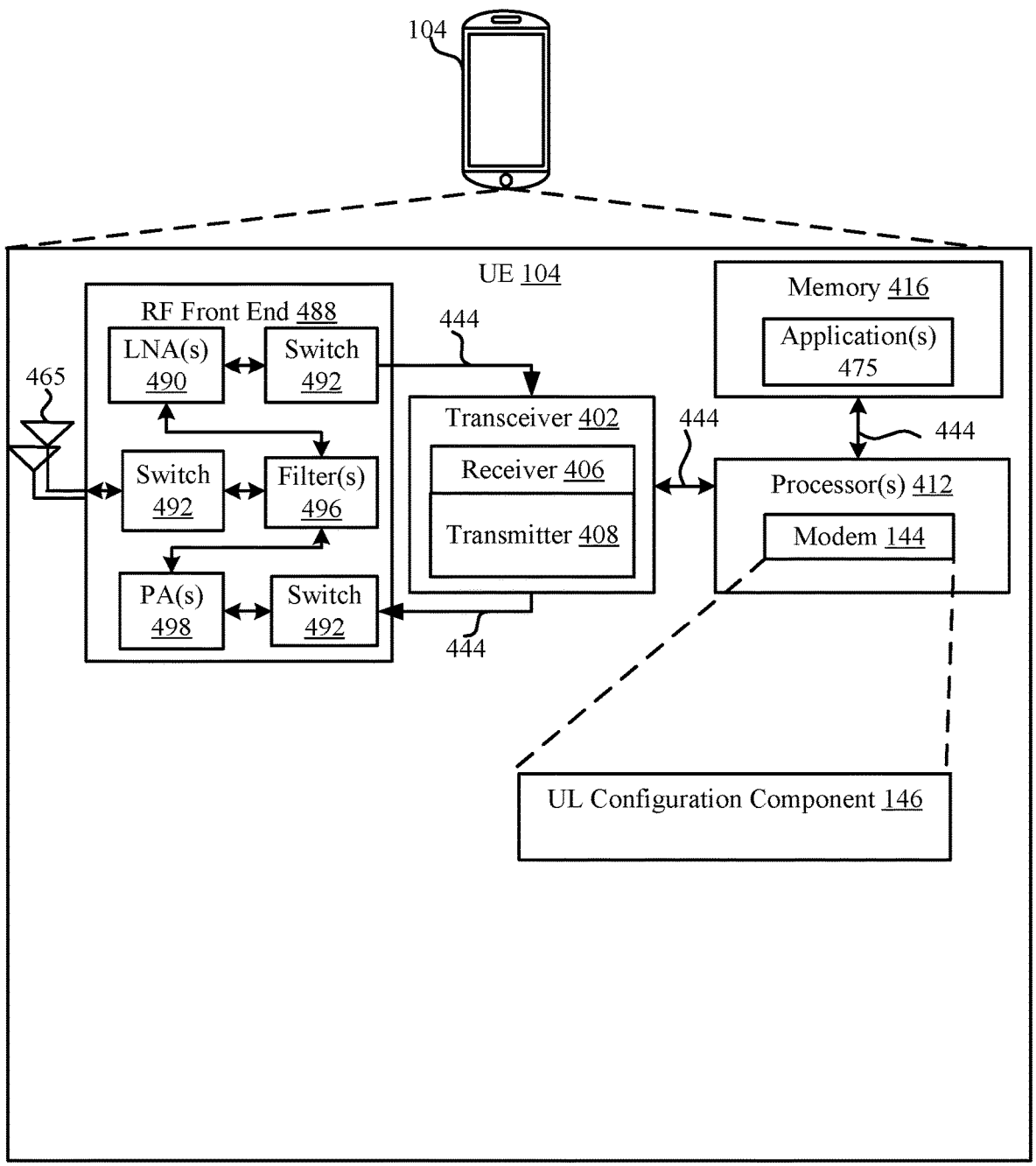
FIG. 4 is a schematic diagram of an example of the UE of FIG. 1, according to aspects of the present disclosure.

Referring to FIG. 4, one example of an implementation of the UE 104 may include a variety of components, some of which have already been described above, but including components such as one or more processors 412, memory 416, and transceiver 402 in communication via one or more buses 444, which may operate in conjunction with the modem 144 to enable one or more of the functions of the methods 200 and 300 described herein. The one or more processors 412, modem 140, memory 416, the transceiver 402, RF front end 488 and one or more antennas 465, may be configured to support voice and/or data calls (simultaneously or non-simultaneously) in one or more radio access technologies.

In an aspect, the one or more processors 412 may include the modem 144 that uses one or more modem processors. The various functions related to the UL configuration component 146 may be included in the modem 144 and/or the processors 412 and, in an aspect, may be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with the transceiver 402. In other aspects, some of the features of the one or more processors 412 and/or the modem 144 may be performed by the transceiver 402.

Also, the memory 416 may be configured to store data used herein and/or local versions of applications 475 or the UL configuration component 146 and/or one or more of its subcomponents being executed by the at least one processors 412. The memory 416 may include any type of computer-readable medium usable by a computer or the at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining the UL configuration component 146 and/or one or more of its subcomponents, and/or data associated therewith, when the UE 104 is operating the at least one processor 412 to execute the UL configuration component 146 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one of the base stations 102. Additionally, the receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may include, but is not limited to, an RF transmitter. The transceiver 402, receiver 406, and/or transmitter 408 may be configured to operate in mmW frequencies and/or near mmW frequencies.

Moreover, in an aspect, the UE 104 may include the RF front end 488, which may operate in communication with one or more antennas 465 and the transceiver 402 for receiving and transmitting radio transmissions, for example, wireless communications transmitted by at least one of the base stations 102 or wireless transmissions transmitted by the UE 104. The RF front end 488 may be connected to the one or more antennas 465 and may include one or more low-noise amplifiers (LNAs) 490, one or more switches 492, one or more power amplifiers (PAs) 498, and one or more filters 496 for transmitting and receiving RF signals.

In an aspect, the LNA 490 may amplify a received signal at a desired output level. In an aspect, each of the LNAs 490 may have a specified minimum and maximum gain values. In an aspect, the RF front end 488 may use the one or more switches 492 to select a particular LNA 490 and its specified gain value based on a desired gain value for a particular application.

The one or more PA(s) 498 may be used by the RF front end 488 to amplify a signal for an RF output at a desired output power level. In an aspect, each of the PAs 498 may have specified minimum and maximum gain values. In an aspect, the RF front end 488 may use the one or more switches 492 to select a particular PA 498 and its specified gain value based on a desired gain value for a particular application.

Also, for example, the one or more filters 496 may be used by the RF front end 488 to filter a received signal to obtain an input RF signal. Similarly, in an aspect, for example, a respective filter 496 may be used to filter an output from a respective PA 498 to produce an output signal for transmission. In an aspect, each of the filters 496 may be connected to a specific LNA 490 and/or PA 498. In an aspect, the RF front end 488 may use the one or more switches 492 to select a transmit or receive path using a specified filter 496, LNA 490, and/or PA 498, based on a configuration as specified by the transceiver 402 and/or the processor 412.

As such, the transceiver 402 may be configured to transmit and receive wireless signals through the one or more antennas 465 via the RF front end 488. In an aspect, the transceiver 402 may be tuned to operate at specified frequencies such that the UE 104 may communicate with, for example, one or more of the base stations 102 or one or more cells associated with one or more of the base stations 102. In an aspect, for example, the modem 144 may configure the transceiver 402 to operate at a specified frequency and power level based on the UE configuration of the UE 104 and the communication protocol used by the modem 144.

In an aspect, the modem 144 may be a multiband-multimode modem, which may process digital data and communicate with the transceiver 402 such that the digital data is sent and received using the transceiver 402. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 488, transceiver 402) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 5:
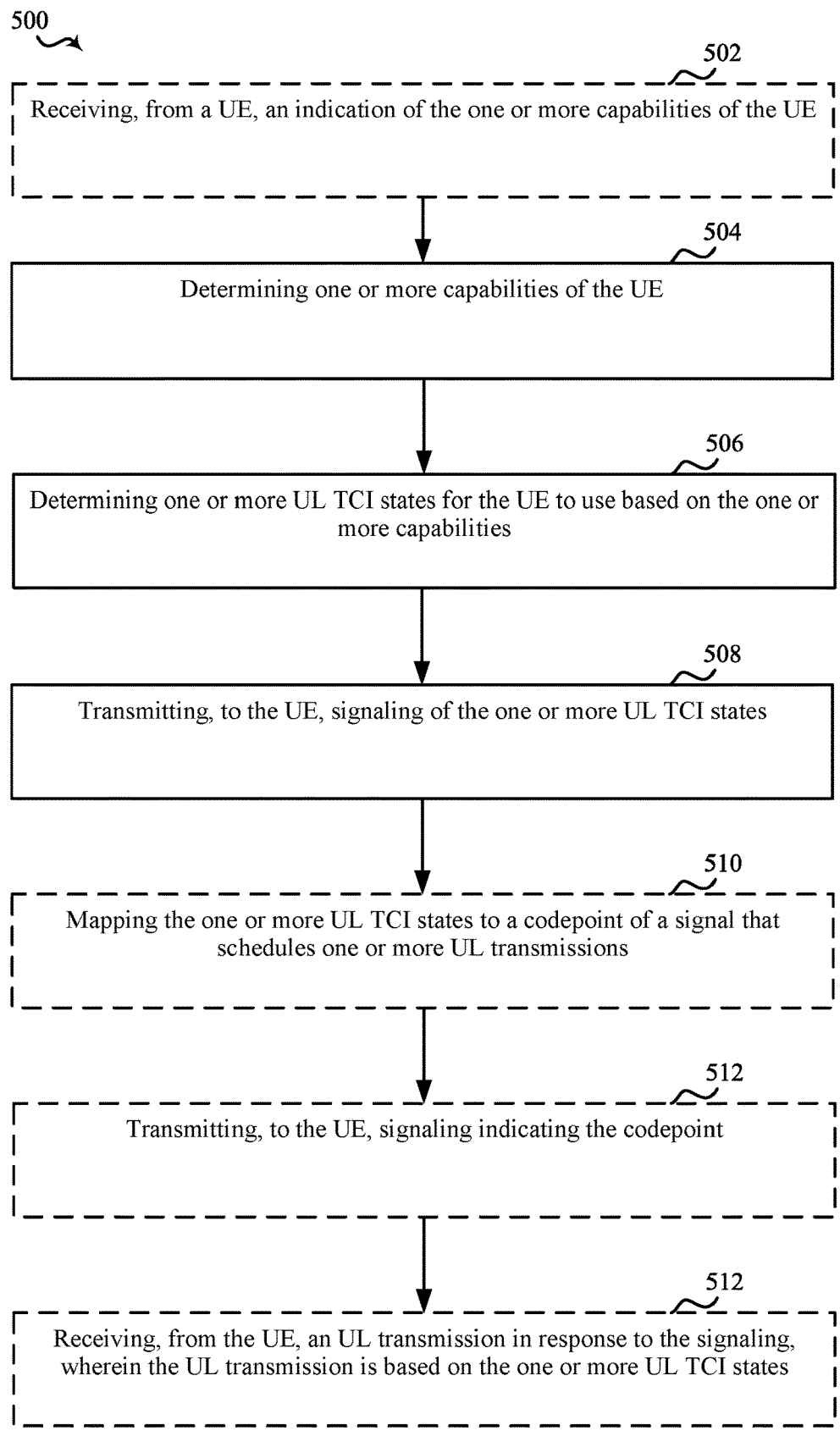
FIG. 5 is a flowchart of an example method of wireless communications by a base station, according to aspects of the present disclosure.
Figure 6:
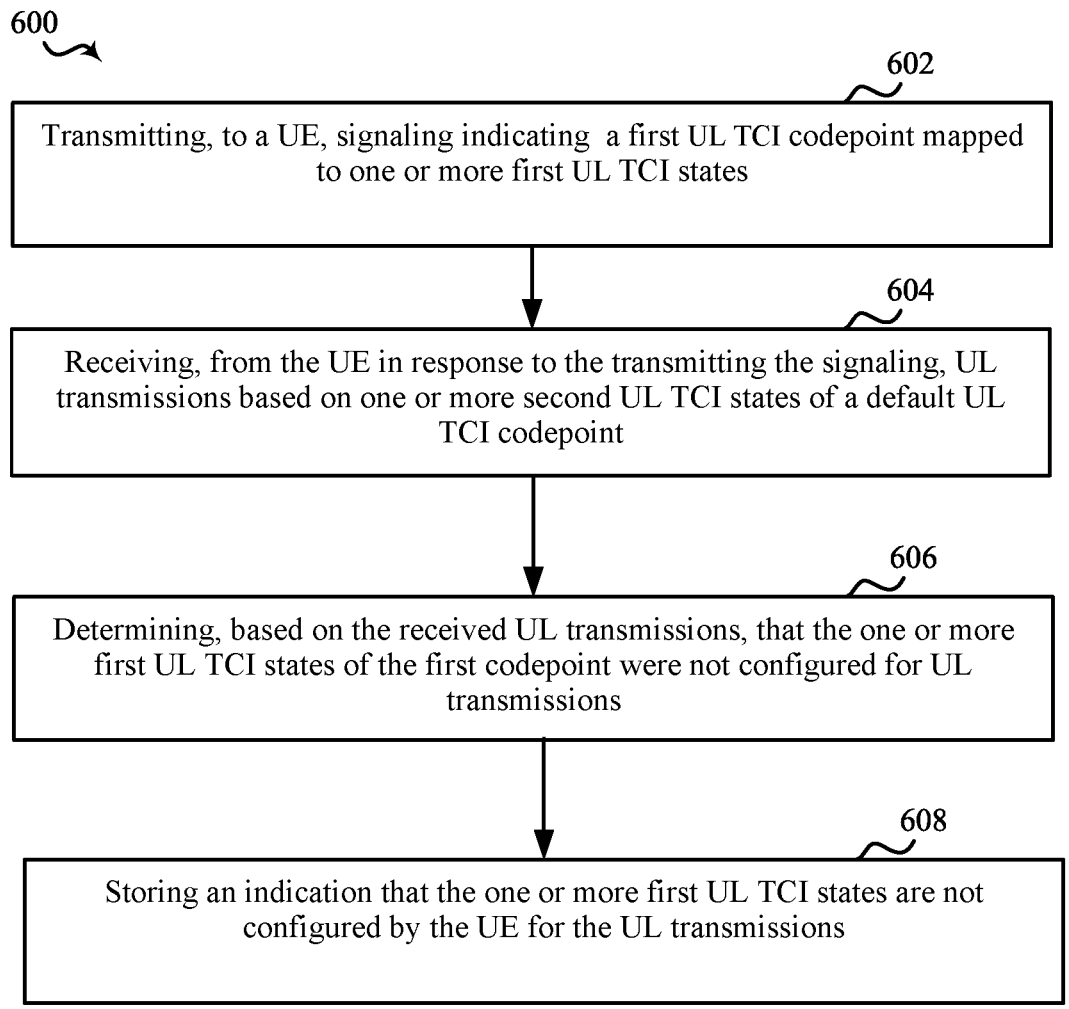
FIG. 6 is a flowchart of another example method of wireless communications by a base station, according to aspects of the present disclosure.

Referring to FIGS. 5 and 6, example methods 500 and 600 of wireless communications are disclosed. The methods 500 and 600 may be performed by the base station 102 of FIG. 1 along with any of the components (see e.g., FIG. 7) of the base station 102. For example, the methods 500 and 600 may be performed by one or more of the a processor 712, a transceiver 702, the modem 140, the TCI signaling component 142, and/or one or more additional components/subcomponents of the base station 102.

Turning to FIG. 5, at 502, the method 500 may optionally include receiving, from a UE, an indication of the one or more capabilities of the UE. For example, one or more of the processor 712, the transceiver 702, the modem 140, the TCI signaling component 142 and/or one or more components/subcomponents of the base station 102 may be configured to receive, from the UE 104, an indication of the one or more capabilities of the UE 104. Thus, the processor 712, the transceiver 702, the modem 140, the TCI signaling component 142, and/or one or more components/subcomponents of the base station 102 may define the means for receiving, from the UE 104, an indication of the one or more capabilities of the UE 104. In an example, the one or more capabilities of the UE 104 may include, for example, capabilities of the UE 104 to support multiple transmissions from multiple panels of a base station 102 or capabilities of the UE 104 to support a switching time to activate transmissions between panels of the base station 102.

At 504, the method 500 may include determining one or more capabilities of a UE. For example, one or more of the processor 712, the modem 140, the TCI signaling component 142 and/or one or more components/subcomponents of the base station 102 may be configured to determine one or more capabilities of the UE 104. Thus, the processor 712, the modem 140, the TCI signaling component 142, and/or one or more components/subcomponents of the base station 102 may define the means for determining one or more capabilities of the UE 104. In an example, the one or more capabilities of the UE 104 may be determined based on the received indication of the capabilities from the UE 104. In another example, the one or more capabilities of the UE 104 may be determined based on stored data indicating the capabilities.

At 506, the method 500 may also include determining one or more UL TCI states for the UE to use based on the one or more capabilities. For example, one or more of the processor 712, the modem 140, the TCI signaling component 142 and/or one or more components/subcomponents of the base station 102 may be configured to determine the one or more UL TCI states for the UE 104 to use based on the one or more capabilities. Thus, the processor 712, the modem 140, the TCI signaling component 142, and/or one or more components/subcomponents of the base station 102 may define the means for determining the one or more UL TCI states for the UE 104 to use based on the one or more capabilities. In an example, the one or more UL TCI states may be based on one or more of an SDM scheme, an FDM scheme, or a TDM scheme. In an example, the base station 102 may determine one or more UL TCI states for the UE 104 based on capabilities of the UE 104 that allow mapping of multiple UL TCI states to a same codepoint. These capabilities may include, for example, the UE 104 supporting simultaneously transmitting (e.g., on UE 104 side) from multiple panels (e.g., as in SDM), the UE 104 supporting the timing of switching between different beams for back-to-back UL transmissions (e.g., as in TDM), or the UE 104 supporting multiple beams (e.g., TCI states) being transmitted simultaneously from the same panel but different resource blocks (RBs) (e.g., as in FDM).

At 508, the method 500 may also include transmitting, to the UE, signaling of the one or more UL TCI states. For example, one or more of the processor 712, the transceiver 702, the modem 140, the TCI signaling component 142 and/or one or more components/subcomponents of the base station 102 may be configured to transmit, to the UE 104, the signaling of the one or more UL TCI states. Thus, the processor 712, the transceiver 702, the modem 140, the TCI signaling component 142, and/or one or more components/subcomponents of the base station 102 may define the means for transmitting, to the UE 104, the signaling of the one or more UL TCI states. In an example, the signaling of the one or more UL TCI states is transmitted via one or more of a DCI signal, an MAC-CE signal, or an RRC signal.

At 510, the method 500 may optionally include mapping the one or more UL TCI states to a codepoint of a signal that schedules one or more UL transmissions. For example, one or more of the processor 712, the modem 140, the TCI signaling component 142 and/or one or more components/subcomponents of the base station 102 may be configured to map the one or more UL TCI states to a codepoint of a signal that schedules one or more UL transmissions. Thus, the processor 712, the transceiver 702, the modem 140, the TCI signaling component 142, and/or one or more components/subcomponents of the base station 102 may define the means for mapping the one or more UL TCI states to a codepoint of a signal that schedules one or more UL transmissions. In an example, the codepoint may be a code, a string, or one or more bits of a DCI signal.

At 512, the method 500 may include transmitting, to the UE, signaling indicating the codepoint. For example, one or more of the processor 712, the transceiver 702, the modem 140, the TCI signaling component 142 and/or one or more components/subcomponents of the base station 102 may be configured to transmit, to the UE 104, signaling indicating the codepoint. Thus, the processor 712, the transceiver 702, the modem 140, the TCI signaling component 142, and/or one or more components/subcomponents of the base station 102 may define the means for transmitting, to the UE 104, signaling indicating the codepoint.

At 514, the method 500 may optionally include receiving, from the UE, an UL transmission in response to the signaling, wherein the UL transmission is based on the one or more UL TCI states. For example, one or more of the processor 712, the transceiver 702, the modem 140, the TCI signaling component 142 and/or one or more components/subcomponents of the base station 102 may be configured to receive, from the UE 104, an UL transmission in response to the signaling, wherein the UL transmission is based on the one or more UL TCI states. Thus, the processor 712, the transceiver 702, the modem 140, the TCI signaling component 142, and/or one or more components/subcomponents of the base station 102 may define the means for receiving, from the UE 104, an UL transmission in response to the signaling, wherein the UL transmission is based on the one or more UL TCI states.

Turning to FIG. 6, at 602, the method 600 may include transmitting, to a UE, signaling indicating a first UL TCI codepoint mapped to one or more first UL TCI states. For example, one or more of the processor 712, the transceiver 702, the modem 140, the TCI signaling component 142 and/or one or more components/subcomponents of the base station 102 may be configured to transmit, to the UE 104, signaling indicating a first UL TCI codepoint mapped to one or more first UL TCI states. Thus, the processor 712, the transceiver 702, the modem 140, the TCI signaling component 142, and/or one or more components/subcomponents of the base station 102 may define the means for transmitting, to the UE 104, signaling indicating a first UL TCI codepoint mapped to one or more first UL TCI states. In an example, the one or more UL TCI states may be based on one or more of an SDM scheme, an FDM scheme, or a TDM scheme. In an example, the codepoint is a code, a string, or one or more bits of a DCI signal.

At 604, the method 600 may include receiving, from the UE in response to the transmitting the signaling, UL transmissions based on one or more second UL TCI states of a default UL TCI codepoint. For example, one or more of the processor 712, the transceiver 702, the modem 140, the TCI signaling component 142 and/or one or more components/subcomponents of the base station 102 may be configured to receive, from the UE 104 in response to the transmitting the signaling, UL transmissions based on one or more second UL TCI states of a default UL TCI codepoint. Thus, the processor 712, the transceiver 702, the modem 140, the TCI signaling component 142, and/or one or more components/subcomponents of the base station 102 may define the means for receiving, from the UE 104 in response to the transmitting the signaling, UL transmissions based on one or more second UL TCI states of a default UL TCI codepoint.

At 606, the method 600 may also include determining, based on the received UL transmissions, that the one or more first UL TCI states of the first codepoint were not configured for UL transmissions. For example, one or more of the processor 712, the modem 140, the TCI signaling component 142 and/or one or more components/subcomponents of the base station 102 may be configured to determine, based on the received UL transmissions, that the one or more first UL TCI states of the first codepoint were not configured for UL transmissions. Thus, the processor 712, the modem 140, the TCI signaling component 142, and/or one or more components/subcomponents of the base station 102 may define the means for determining, based on the received UL transmissions, that the one or more first UL TCI states of the first codepoint were not configured for UL transmissions. In an example, the first UL TCI states may not have been configured for UL transmissions based on the one or more first UL TCI states not being ready in time for the UL transmissions. In an example, the first UL TCI states may not have been configured for UL transmissions based on the one or more first UL TCI states being received by the UE 104 within a time-domain scheduling threshold.

At 608, the method 600 may also include storing an indication that the one or more first UL TCI states are not configured by the UE for the UL transmissions. For example, one or more of the processor 712, the modem 140, the TCI signaling component 142 and/or one or more components/subcomponents of the base station 102 may be configured to storing an indication that the one or more first UL TCI states are not configured by the UE 104 for the UL transmissions. Thus, the processor 712, the modem 140, the TCI signaling component 142, and/or one or more components/subcomponents of the base station 102 may define the means for storing an indication that the one or more first UL TCI states are not configured by the UE 104 for the UL transmissions.

Figure 7:
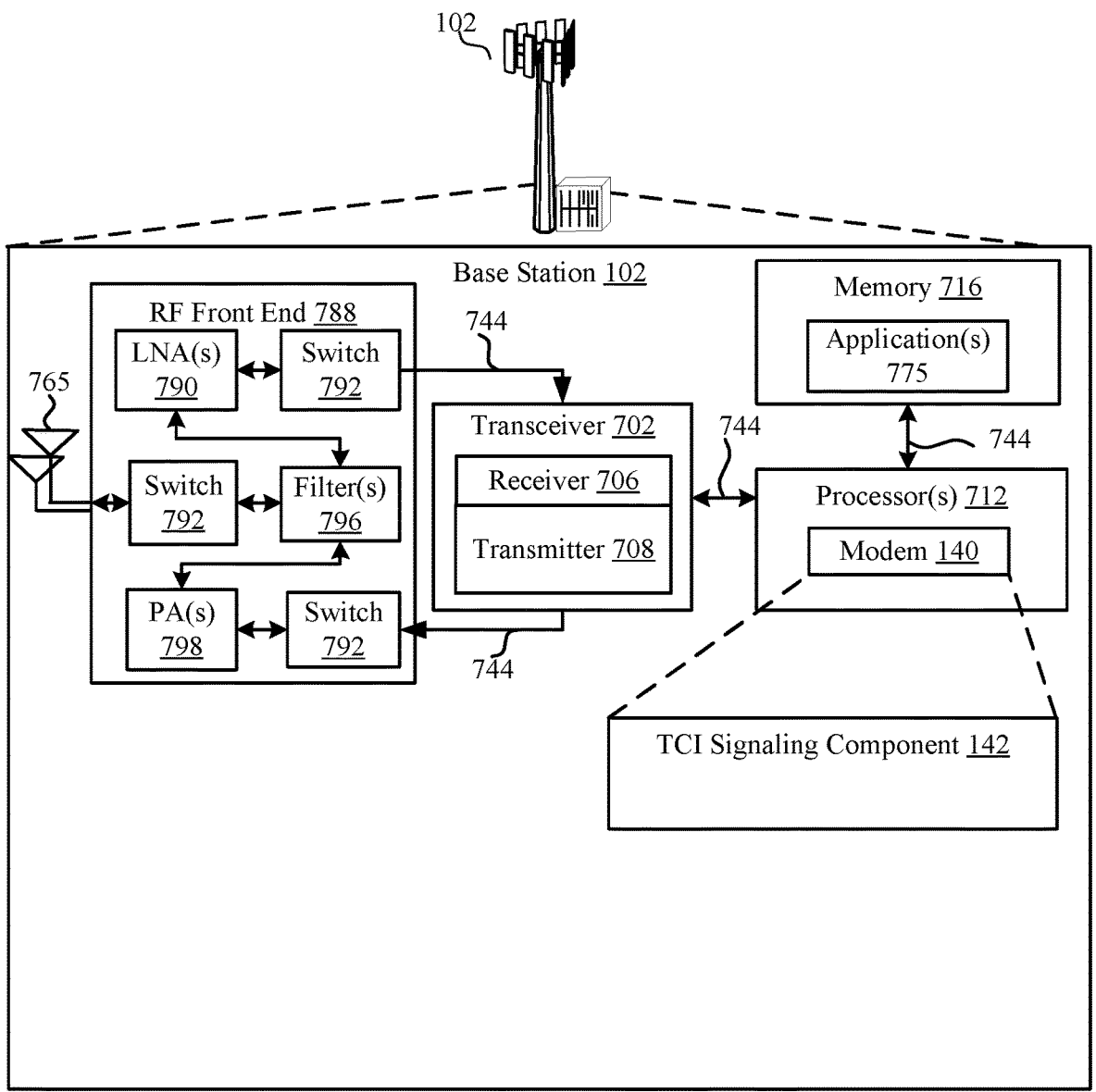
FIG. 7 is a schematic diagram of an example of the base station of FIG. 1, according to aspects of the present disclosure.

Referring to FIG. 7, one example of an implementation of base station 102 may include a variety of components, some of which have already been described above, but including components such as one or more processors 712, memory 716 and transceiver 702 in communication via one or more buses 744, which may operate in conjunction with modem 140 and the TCI signaling component 142 to enable one or more of the functions of the methods 500 and 600 described herein.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of the UE 104, as described above, but configured or otherwise programmed for base station operations as opposed to UE operations.

Some Further Example Embodiments

An example method of wireless communication by a UE, comprising: receiving, from a base station, signaling indicating one or more uplink transmission configuration indicator (TCI) states; configuring, based on the signaling indicating the one or more uplink TCI states, the one or more uplink TCI states to be used by the UE for uplink transmissions; and transmitting, to the base station, the uplink transmissions based on the one or more uplink TCI states.

The above example method, further comprising: receiving, from the base station, signaling indicating a codepoint that schedules one or more of the uplink transmissions.

One or more of the above example methods, wherein the codepoint is a code, a string, or one or more bits of a downlink configuration indicator (DCI).

One or more of the above example methods, further comprising: transmitting, to the base station, an indication of one or more capabilities of the UE, wherein the receiving the signaling is in response to the indication being transmitted.

One or more of the above example methods, wherein the signaling indicating the one or more uplink TCI states is indicated via a mapping of the one or more uplink TCI states to a single uplink TCI codepoint.

One or more of the above example methods, wherein the signaling indicating the one or more uplink TCI states is received via one or more of a downlink configuration indicator (DCI) signal, a media access control-control element (MAC-CE) signal, or a radio resource control (RRC) signal.

One or more of the above example methods, wherein the signaling indicates the one or more uplink TCI states via a mapping of the one or more uplink TCI states to a single composite multiple transmission and reception point (mTRP) uplink TCI state.

One or more of the above example methods, wherein the uplink transmissions are one or more of a sounding reference signal (SRS), a physical uplink control channel (PUCCH), a physical uplink shared channel (PUSCH), or a physical random access channel (PRACH).

One or more of the above example methods, wherein the one or more uplink TCI states are based on one or more of a space division multiplexing (SDM) scheme, a frequency division multiplexing (FDM) scheme, or a time division multiplexing (TDM) scheme.

One or more of the above example methods, wherein when the one or more uplink TCI states are based on the SDM scheme, the uplink transmissions are transmitted simultaneously in overlapped frequency resources.

One or more of the above example methods, wherein when the one or more uplink TCI states are based on the FDM scheme, the uplink transmissions are transmitted simultaneously in non-overlapped frequency resources.

One or more of the above example methods, wherein when the one or more uplink TCI states are based on the TDM scheme, the uplink transmissions are transmitted in different time resources.

An example apparatus for wireless communication, comprising: a memory storing instructions; and at least one processor communicatively coupled to the memory and configured to perform any of the above example methods.

An example computer-readable medium storing computer executable code, comprising code to: perform any of the above example methods.

Another example apparatus, comprising: means for performing any of the above example methods.

A second example method of wireless communication by a base station, comprising: determining one or more capabilities of a user equipment (UE); determining one or more uplink transmission configuration indicator (TCI) states for the UE to use based on the one or more capabilities; and transmitting, to the UE, signaling of the one or more uplink TCI states.

The above second example method, further comprising: mapping the one or more uplink TCI states to a codepoint of a signal that schedules one or more uplink transmissions; and transmitting, to the UE, signaling indicating the codepoint.

One or more of the above second example methods, wherein the codepoint is a code, a string, or one or more bits of a downlink configuration indicator (DCI).

One or more of the above second example methods, further comprising: receiving, from the UE, an indication of the one or more capabilities of the UE, wherein the determining the one or more capabilities of the UE is in response to receiving the indication.

One or more of the above second example methods, the determining the one or more capabilities of the UE is based on a stored setting.

One or more of the above second example methods, further comprising: receiving, from the UE, an uplink transmission in response to the signaling, wherein the uplink transmission is based on the one or more uplink TCI states.

One or more of the above second example methods, wherein the uplink transmission is one of a sounding reference signal (SRS), a physical uplink control channel (PUCCH), physical uplink shared channel (PUSCH), or physical random access channel (PRACH).

One or more of the above second example methods, wherein the signaling of the one or more uplink TCI states is transmitted via one or more of a downlink configuration indicator (DCI) signal, a media access control-control element (MAC-CE) signal, or a radio resource control (RRC) signal.

One or more of the above second example methods, wherein the one or more uplink TCI states are based on one or more of a space division multiplexing (SDM) scheme, a frequency division multiplexing (FDM) scheme, or a time division multiplexing (TDM) scheme.

An example apparatus for wireless communication, comprising: a memory storing instructions; and at least one processor communicatively coupled to the memory and configured to perform any of the above second example methods.

An example computer-readable medium storing computer executable code, comprising code to: perform any of the above second example methods.

Another example apparatus, comprising: means for performing any of the above second example methods.

A third example method of wireless communication by a user equipment (UE), comprising: receiving, from a base station, signaling indicating a first uplink transmission configuration indicator (TCI) codepoint mapped to one or more first uplink TCI states; determining that the one or more first uplink TCI states of the first uplink TCI codepoint are not configured for uplink transmissions; determining, in response to the one or more first uplink TCI states not being configured, one or more second uplink TCI states of a default uplink TCI codepoint that are configured for the uplink transmissions; and transmitting, to the base station, the uplink transmissions based on the one or more second uplink TCI states.

The above third example method, further comprising: determining an index of the default uplink TCI codepoint mapped to the one or more second uplink TCI states, wherein the index of the default uplink TCI codepoint is sequentially higher or lower than an index of the first uplink TCI codepoint mapped to the one or more first uplink TCI states, wherein the one or more second TCI states are determined based on the index of the default uplink TCI codepoint.

One or more of the above third example methods, further comprising: determining an index of the default uplink TCI codepoint mapped to the one or more second uplink TCI states, wherein the index of the default uplink TCI codepoint corresponds to a recently used uplink TCI codepoint, wherein the one or more second TCI states are determined based on the index of the default uplink TCI codepoint.

An example apparatus for wireless communication, comprising: a memory storing instructions; and at least one processor communicatively coupled to the memory and configured to perform any of the above third example methods.

An example computer-readable medium storing computer executable code, comprising code to: perform any of the above third example methods.

Another example apparatus, comprising: means for performing any of the above third example methods.

A fourth example method of wireless communication by a base station, comprising: transmitting, to a user equipment (UE), signaling indicating a first uplink transmission configuration indicator (TCI) codepoint mapped to one or more first uplink TCI states; receiving, from the UE in response to the transmitting the signaling, uplink transmissions based on one or more second uplink TCI states of a default uplink TCI codepoint; determining, based on the received uplink transmissions, that the one or more first uplink TCI states of the first codepoint were not configured for uplink transmissions; and storing an indication that the one or more first UL TCI states are not configured by the UE for the UL transmissions.

An example apparatus for wireless communication, comprising: a memory storing instructions; and at least one processor communicatively coupled to the memory and configured to perform the above fourth example method.

An example computer-readable medium storing computer executable code, comprising code to: perform the above fourth example method.

Another example apparatus, comprising: means for performing the above fourth example method.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
receiving, from a base station, a single signal indicating multiple uplink transmission configuration indicator (TCI) states, wherein the single signal indicating multiple uplink TCI states is indicated via a mapping of the multiple uplink TCI states to a single uplink TCI codepoint which applies only to uplink transmissions;
configuring and selecting a transmission scheme, based on the single signal indicating the multiple uplink TCI states, one or more uplink TCI states to be used by the UE for uplink transmissions, wherein the multiple uplink TCI states are based on more than one of a space division multiplexing (SDM) scheme, a frequency division multiplexing (FDM) scheme, or a time division multiplexing (TDM) scheme and the selected transmission scheme is one of SDM scheme, FDM scheme or TDM scheme; and
transmitting, to the base station, the uplink transmissions according to the selected transmission scheme.

2. The method of claim 1, further comprising:
receiving, from the base station, signaling indicating the code point that schedules one or more of the uplink transmissions.

3. The method of claim 2, wherein the code point is a code, a string, or one or more bits of a downlink configuration indicator (DCI).

4. The method of claim 1, further comprising:
transmitting, to the base station, an indication of one or more capabilities of the UE, wherein the receiving the single signal is in response to the indication being transmitted.

5. The method of claim 1, wherein the single signal indicating the multiple uplink TCI states is received via a downlink configuration indicator (DCI) signal, a media access control—control element (MAC-CE) signal, or a radio resource control (RRC) signal.

6. The method of claim 1, wherein the uplink transmissions are one or more of a sounding reference signal (SRS), a physical uplink control channel (PUCCH), a physical uplink shared channel (PUSCH), or a physical random access channel (PRACH).

7. The method of claim 1, wherein when the selected scheme is the SDM scheme, the uplink transmissions are transmitted simultaneously in overlapped frequency resources.

8. The method of claim 1, wherein when the selected scheme is the FDM scheme, the uplink transmissions are transmitted simultaneously in non-overlapped frequency resources.

9. The method of claim 1, wherein when the selected scheme is the TDM scheme, the uplink transmissions are transmitted in different time resources.

10. A method of wireless communication by a base station, comprising:
determining one or more capabilities of a user equipment (UE);
determining multiple uplink transmission configuration indicator (TCI) states for the UE to use based on the one or more capabilities;
transmitting, to the UE, a single signal of the multiple uplink TCI states, wherein the single signal indicating multiple uplink TCI states is indicated via a mapping of the multiple uplink TCI states to a single uplink TCI codepoint which applies only to uplink transmissions, wherein the multiple uplink TCI states are based on more than one of a space division multiplexing (SDM) scheme, a frequency division multiplexing (FDM) scheme, or a time division multiplexing (TDM) scheme; and
receiving, from the UE, an uplink transmission in response to the single signal, wherein the uplink transmission is based on the multiple uplink TCI states and the received uplink transmission is according to a selected transmission scheme and is one of SDM scheme, FDM scheme or TDM scheme.

11. The method of claim 10, further comprising:
mapping the one or more uplink TCI states to the codepoint of the signal that schedules one or more uplink transmissions; and
transmitting, to the UE, signaling indicating the code point.

12. The method of claim 11, wherein the codepoint is a code, a string, or one or more bits of a downlink configuration indicator (DCI).

13. The method of claim 10, further comprising:
receiving, from the UE, an indication of the one or more capabilities of the UE, wherein the determining the one or more capabilities of the UE is in response to receiving the indication.

14. The method of claim 10, the determining the one or more capabilities of the UE is based on a stored setting.

15. The method of claim 10, wherein the uplink transmission is one of a sounding reference signal (SRS), a physical uplink control channel (PUCCH), physical uplink shared channel (PUSCH), or physical random access channel (PRACH).

16. The method of claim 10, wherein the single signal of the multiple uplink TCI states is transmitted via a downlink configuration indicator (DCI) signal, a media access control—control element (MAC-CE) signal, or a radio resource control (RRC) signal.

17. A user equipment (UE), comprising:
a memory storing instructions; and
one or more processors communicatively coupled to the memory and configured to:
receive, from a base station, a single signal indicating one or more uplink transmission configuration indicator (TCI) states, wherein the single signal indicating multiple uplink TCI states is indicated via a mapping of the multiple uplink TCI states to a single uplink TCI codepoint which applies only to uplink transmissions;
configure and select a transmission scheme, based on the single signal indicating the multiple uplink TCI states, one or more uplink TCI states to be used by the UE for uplink transmissions, wherein the multiple uplink TCI states are based on more than one of a space division multiplexing (SDM) scheme, a frequency division multiplexing (FDM) scheme, or a time division multiplexing (TDM) scheme and the selected transmission scheme is one of SDM scheme, FDM scheme or TDM scheme; and
transmit, to the base station, the uplink transmissions according to the selected transmission scheme.

18. The UE of claim 17, wherein the one or more processors is further configured to receive, from the base station, signaling indicating the code point that schedules one or more of the uplink transmissions.

19. The UE of claim 18, wherein the code point is a code, a string, or one or more bits of a downlink configuration indicator (DCI).

20. The UE of claim 17, wherein the one or more processors is further configured to transmit, to the base station, an indication of one or more capabilities of the UE, wherein the single signal is received in response to the indication being transmitted.

21. A base station, comprising:
a memory storing instructions; and
one or more processors communicatively coupled to the memory and configured to:
determine one or more capabilities of a user equipment (UE);
determine multiple uplink transmission configuration indicator (TCI) states for the UE to use based on the one or more capabilities;
transmit, to the UE, a single signal of the multiple uplink TCI states, wherein the single signal indicating multiple uplink TCI states is indicated via a mapping of the multiple uplink TCI states to a single uplink TCI codepoint which applies only to uplink transmissions, wherein the multiple uplink TCI states are based on more than one of a space division multiplexing (SDM) scheme, a frequency division multiplexing (FDM) scheme, or a time division multiplexing (TDM) scheme; and
receive, from the UE, an uplink transmission
in response to the single signal, wherein the uplink transmission is based on the multiple uplink TCI states and the received uplink transmission is according to a selected transmission scheme and is one of SDM scheme, FDM scheme or TDM scheme.

22. The base station of claim 21, wherein the one or more processors is further configured to:
map the multiple uplink TCI states to a code point of a signal that schedules one or more uplink transmissions; and
transmit, to the UE, signaling indicating the code point.

23. The base station of claim 22, wherein the codepoint is a code, a string, or one or more bits of a downlink configuration indicator (DCI).

24. The base station of claim 21, wherein the one or more processors is further configured to:
receive, from the UE, an indication of the one or more capabilities of the UE, wherein the one or more capabilities of the UE is determined in response to receiving the indication.

25. The UE of claim 17, wherein the single signal indicating the multiple uplink TCI states is received via a downlink configuration indicator (DCI) signal, a media access control-control element (MAC-CE) signal, or a radio resource control (RRC) signal.

26. The UE of claim 17, wherein the uplink transmissions are one or more of a sounding reference signal (SRS), a physical uplink control channel (PUCCH), a physical uplink shared channel (PUSCH), or a physical random access channel (PRACH).

* * * * *